US011759711B2

(12) United States Patent
McCain et al.

(10) Patent No.: US 11,759,711 B2
(45) Date of Patent: Sep. 19, 2023

(54) METHOD FOR QUASI-RANDOM PLACEMENT OF VIRTUAL ITEMS IN AN EXTENDED REALITY (XR) SPACE

(71) Applicants: Sony Group Corporation, Tokyo (JP); Sony Corporation of America, New York, NY (US)

(72) Inventors: Robert M. McCain, Chandler, AZ (US); Tsubasa Tsukahara, Los Angeles, CA (US)

(73) Assignees: SONY GROUP CORPORATION, Tokyo (JP); SONY CORPORATION OF AMERICA, New York, NY (US)

( * ) Notice: Subject to any disclaimer, the term of this patent is extended or adjusted under 35 U.S.C. 154(b) by 44 days.

(21) Appl. No.: 17/488,250

(22) Filed: Sep. 28, 2021

(65) Prior Publication Data

US 2023/0097571 A1    Mar. 30, 2023

(51) Int. Cl.
*A63F 13/577* (2014.01)
*A63F 13/52* (2014.01)
*A63F 13/65* (2014.01)

(52) U.S. Cl.
CPC ............ *A63F 13/577* (2014.09); *A63F 13/52* (2014.09); *A63F 13/65* (2014.09); *A63F 2300/643* (2013.01); *A63F 2300/69* (2013.01); *A63F 2300/8082* (2013.01)

(58) Field of Classification Search
CPC ........ A63F 13/577; A63F 13/52; A63F 13/65; A63F 2300/643; A63F 2300/69; A63F 2300/8082
See application file for complete search history.

(56) References Cited

U.S. PATENT DOCUMENTS

| | | | |
|---|---|---|---|
| 9,141,188 B2* | 9/2015 | Fein | G06T 19/006 |
| 10,255,302 B1 | 4/2019 | Cosic | |
| 10,369,472 B1* | 8/2019 | Mattar | A63F 13/35 |
| 10,650,037 B2* | 5/2020 | Tsukahara | G06F 16/437 |
| 10,713,840 B2* | 7/2020 | Taylor | G06F 3/012 |
| 10,928,973 B2 | 2/2021 | Shuster | |
| 10,949,914 B2* | 3/2021 | Bajpai | G06F 3/011 |
| 10,977,774 B2* | 4/2021 | Katori | G06V 20/64 |
| 10,994,216 B2* | 5/2021 | Board | A63F 13/65 |
| 11,017,257 B2* | 5/2021 | Sugihara | G09G 3/001 |
| 11,331,575 B2* | 5/2022 | Mattar | G06F 16/955 |
| 11,348,298 B2* | 5/2022 | Weston | A63F 13/655 |

(Continued)

*Primary Examiner* — William H McCulloch, Jr.
(74) *Attorney, Agent, or Firm* — Trellis IP Law Group, PC

(57) ABSTRACT

A method for quasi-random placement of a virtual item in an XR space includes: accessing a previously generated spatial mapping mesh (SMM) of the XR space; compiling a record from the SMM of open spaces between surfaces of physical elements in the XR space, with corresponding positions and dimensions; selecting from the open spaces: a spawn position for a virtual character, and a random set of other positions, filtering the random set to form a subset. The method then performs a collision analysis to assign a score to each position in the subset partly based on accessibility to that position for the virtual character beginning from the spawn position; and places the virtual item at a position in the subset having a score as high or higher than all other positions in the subset. The method is carried out before user interaction with any virtual element in the XR space.

18 Claims, 11 Drawing Sheets

(56) References Cited

U.S. PATENT DOCUMENTS

| | | | |
|---|---|---|---|
| 11,380,022 B2* | 7/2022 | Rajarathnam | G06T 11/00 |
| 11,527,171 B2* | 12/2022 | Freiwirth | A63F 13/213 |
| 11,553,009 B2* | 1/2023 | Takahashi | G06T 19/006 |
| 2009/0197686 A1 | 8/2009 | Bergelt | |
| 2012/0105475 A1* | 5/2012 | Tseng | G01S 19/13 |
| | | | 345/633 |
| 2015/0178967 A1* | 6/2015 | Kruglick | G06T 11/60 |
| | | | 345/625 |
| 2018/0329908 A1* | 11/2018 | Tsukahara | G06F 16/487 |
| 2020/0335001 A1* | 10/2020 | Freiwirth | A63F 13/216 |
| 2020/0356917 A1* | 11/2020 | Sharma | G06Q 10/101 |
| 2021/0001214 A1* | 1/2021 | Flego | A63F 13/28 |
| 2021/0248826 A1 | 8/2021 | Shriram | |
| 2021/0283497 A1 | 9/2021 | Gullicksen | |
| 2022/0096010 A1* | 3/2022 | Vankipuram | A63F 13/285 |
| 2022/0130077 A1* | 4/2022 | Rajarathnam | G06V 20/20 |
| 2022/0232104 A1* | 7/2022 | Brimhall | H04L 67/131 |

* cited by examiner

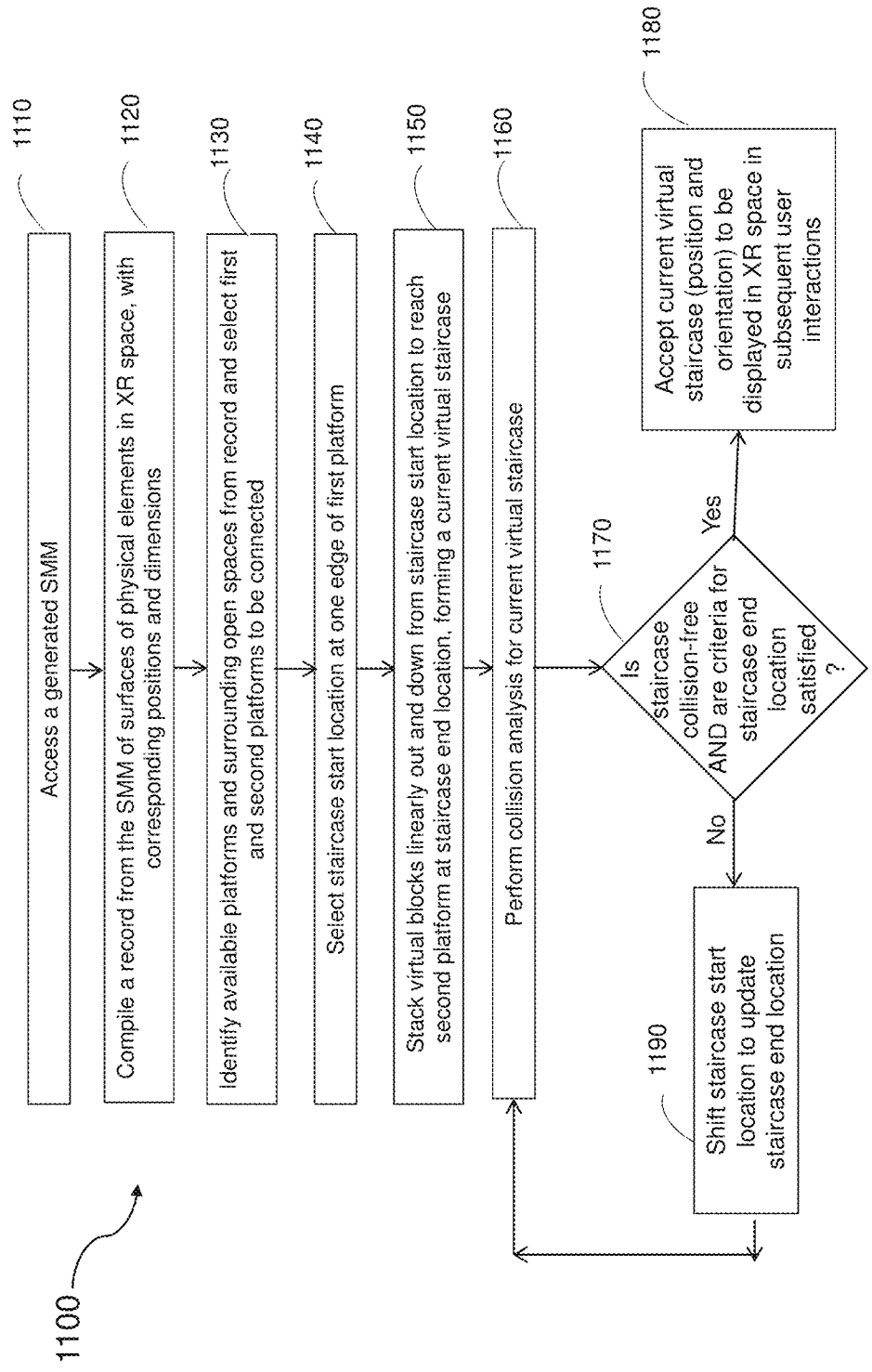

METHOD FOR QUASI-RANDOM PLACEMENT OF VIRTUAL ITEMS IN AN EXTENDED REALITY (XR) SPACE

CROSS REFERENCES TO RELATED APPLICATIONS

This application is related to the following applications: U.S. patent application Ser. No. 17/488,245, entitled "METHOD FOR PREDEFINING IN AN XR SPACE AN ENTRYWAY CORRESPONDING TO A REAL ENTRYWAY", filed on Sep. 28, 2021 (020699-118300US/SYP339929US01);
U.S. patent application Ser. No. 17/488,247, entitled "METHOD FOR PREDEFINING A VIRTUAL ENTRYWAY AT A VIRTUAL BOUNDARY OF AN XR SPACE", filed on Sep. 28, 2021 (020699-118400US/SYP340053US01);
U.S. patent application Ser. No. 17/488,248, entitled "METHOD FOR PREDEFINING ACTIVITY ZONES IN AN EXTENDED REALITY (XR) ENVIRONMENT", filed on Sep. 28, 2021 (020699-118500US/SYP340054US01);
U.S. patent application Ser. No. 17/488,249, entitled "METHOD TO USE RECOGNITION OF NEARBY PHYSICAL SURFACES TO GENERATE NPC REACTIONS TO EVENTS", filed on Sep. 28, 2021 (020699-118600US/SYP340055US01);
U.S. patent application Ser. No. 17/488,251, entitled "METHOD TO REGULATE JUMPS AND FALLS BY PLAYABLE CHARACTERS IN XR SPACES", filed on Sep. 28, 2021 (020699-118800US/SYP340057US01);
U.S. patent application Ser. No. 17/488,253, entitled "METHODS FOR PREDEFINING VIRTUAL STAIRCASES CONNECTING PLATFORMS IN EXTENDED REALITY (XR) ENVIRONMENTS", filed on Sep. 28, 2021 (020699-118900US/SYP340058US01);
and U.S. patent application Ser. No. 17/488,254, entitled "METHOD TO IMPROVE USER UNDERSTANDING OF XR SPACES BASED IN PART ON MESH ANALYSIS OF PHYSICAL SURFACES", filed on Sep. 28, 2021 (020699-119000US/SYP340059US01);
each of which are hereby incorporated by reference as if set forth in full in this application for all purposes.

BACKGROUND

While virtual reality (VR) technologies aim to immerse a user in artificially generated or synthesized environments inspired by real or imaginary aim to immerse a user in artificially generated or synthesized environments inspired by real or imaginary environments, augmented reality (AR) technologies superimpose synthesized elements onto a real environment to which the user is exposed. The term mixed reality (MR) is used to refer to technologies that combine VR and AR, allowing a user to interact in real time with real and synthesized elements. More generally, the term extended reality or XR is used to encompass all three terms, although it is often (as in this disclosure) used interchangeably with MR.

Games, marketing and training are among the main applications for XR technology. This disclosure will focus on XR games, but it should be appreciated that there are many other applications for XR technology, including, for example, product marketing and skills training, and many of the ideas discussed herein could be applied to any of these areas without departing from the spirit or scope of the invention.

A primary goal of the game developer is to provide the user with as fully immersive an experience as possible, in which the user can interact naturally with either real or synthesized (virtual) elements, and in which the virtual characters or objects behave "naturally" even though the real elements making up the physical environments in which the user may want to play—in different rooms in their home, or office, for example—will normally be completely unknown to the game developer. In currently available XR applications, this goal is far from being achieved.

Consider, for example, a typical case of an XR game designed to be played in a defined space contained within a larger, real environment containing items of furniture and structural elements like kitchen counters and walls. The game may involve virtual characters playing subsidiary roles in the action of the game, but in current games, these character are positioned somewhat arbitrarily within the XR space, without any particular linkage to the real items present, apart from, at most, being in an open space between those real elements. For example, even if there is a table present in a room (which will be used as the XR space) with a significant area of open tabletop surface, a virtual character in a game the user may play in that XR space may well be positioned standing near the table, but only interacting with other virtual objects not with the table that is clearly visible to the user. Similarly if there is an real empty chair present, the virtual character may be positioned in front of it, but would not appear to be seated in it.

These limitations obviously do not aid the illusion the developer is trying to create, of those characters being "real" entities, human or not, who behave in ways a real character might, such as by placing a mug on the real tabletop, playing a game of table tennis with another character at the opposite side of the table, sitting on the chair or leaning against the chair back, and so on.

There is therefore a need for methods and systems that can define spatial zones around real elements in any given XR space, assigning corresponding appropriate activities to those zones, such that a virtual character in a game subsequently played in that space could engage in an activity within one of those zones that would seem, to the player of the game, to be a natural use of the nearby real element. It would of course be desirable for such methods and systems to leverage currently available hardware as appropriate, and to be computationally efficient, using minimal resources in time and computing power, to determine the locations of those zones and select suitable activities in which virtual characters in the XR game could be engaged there, as and when appropriate.

Another type of situation encountered in some XR games involves a playable character being asked to interact with a virtual item (or items) located at a seemingly random position (or positions) in the XR space that is unknown in advance to the character. The problem to be addressed in advance of the game being played is how to select a position[1] at which to place each virtual item so that the character will subsequently be able to see it and reach it, while navigating around various real elements in a real-world arrangement that may be different for each user, or for different times and occasions even with the same user. In many case, the game involves a challenge to the playable character to find as many as possible of a particular category of virtual items as possible—virtual gold coins for example—seemingly previously placed at random positions within the XR game space.

[1]Note that the words "position" and "location" are used interchangeably throughout this disclosure.

There is therefore a need for methods and systems that can find positions at which to place virtual items in a defined XR space such that they appear in natural relationships with those element—such that a virtual gold bar may be lying on the floor next to a table leg, for example, rather than seeming to be half-embedded in the leg itself, or floating in the air above the tabletop. The placement should also be made such that the playable character positioned at a particular location within the XR space is potentially able to reach them—the virtual item may be positioned on top of a desk, for example, rather than under a sofa in a space too narrow for the character's arm to get into, or between a closet and a wall, where the character could not see it. It would of course be desirable for such methods and systems to leverage currently available hardware as appropriate, and to be computationally efficient, using minimal resources in time and computing power, to determine the placement locations of those zones appropriately for the XR game in ways that increase user engagement.

Yet another type of situation encountered in some XR games involves a playable character trying to move around an XR space to perform some task—which could be collecting virtual items as just discussed, or maybe running away from a hostile character, or chasing someone playfully. It is relatively easy for a game developer without prior knowledge of the particular XR space to arrange for the character to be restricted to open spaces that the character could move through at floor level, but currently available games do not allow for them to move between real horizontal surfaces unconnected by steps unless the vertical separation between those levels is small enough for it to be plausible for the character to jump or clamber between them.

There is therefore a need for methods and systems to be able to define locations and arrangements that could connect real horizontal surfaces in a defined XR space by realistic virtual flights of steps, allowing a virtual character in a game subsequently played in that space to be able to move naturally between those surfaces.

SUMMARY

Embodiments generally relate to methods and systems for predefining, in advance of user interaction with any virtual elements in an XR space, aspects of portions of the XR space such that apparently natural interactions may subsequently occur between virtual and real elements within that XR space.

In one embodiment, a method for quasi-random pre-placement of a virtual item in an extended reality (XR) space comprises: accessing a previously generated spatial mapping mesh (SMM) in which the XR space is defined, the SMM including surfaces of physical elements present in that space; compiling a record from the SMM of a first plurality of open spaces between the surfaces, with corresponding positions and dimensions; and then selecting from the first plurality of open spaces a spawn position suitable for a virtual character in a video game designed to be played in the XR space, and a second plurality of positions, chosen at random except for excluding the spawn position. The method further comprises filtering the second plurality of positions to determine a subset of positions; performing a collision analysis for each position in the subset such that a score is assigned to that position based at least in part on accessibility to that position for the virtual character beginning from the spawn position; and placing the virtual item at a position in the subset having a score as high or higher than all other positions in the subset. The method is carried out before user interaction with any virtual element in the XR space.

In another embodiment, a method for quasi-random pre-placement of first and second virtual items of equal size in an extended reality (XR) space comprises: accessing a previously generated spatial mapping mesh (SMM) in which the XR space is defined, the SMM including surfaces of physical elements present in that space; compiling a record from the SMM of a first plurality of open spaces between the surfaces, with corresponding positions and dimensions; and selecting from the first plurality of open spaces: a spawn position suitable for a virtual character in a video game designed to be played in the XR space, and a second plurality of positions, chosen at random except for excluding the spawn position. The method further comprises filtering the second plurality of positions to determine a subset of positions; performing a collision analysis for each position in the subset such that a score is assigned to that position based at least in part on accessibility to that position for the virtual character beginning from the spawn position; placing the first virtual item at a first position in the subset having a score as high or higher than all other positions in the subset; revising the subset to exclude the first position; and placing the second virtual item at a second position in the revised subset having a score as high or higher than all other positions in the revised subset. The method is carried out before user interaction with any virtual element in the XR environment.

In yet another embodiment, a system for quasi-random pre-placement of a virtual item in an extended reality (XR) space comprises: one or more processors; and logic encoded in one or more non-transitory media for execution by the one or more processors, where when the logic is executed it is operable to: access a previously generated spatial mapping mesh (SMM) in which the XR space is defined, the SMM including surfaces of physical elements present in that space; compile a record from the SMM of a first plurality of open spaces between the surfaces, with corresponding positions and dimensions; and select from the first plurality of open spaces a spawn position suitable for a virtual character in a video game designed to be played in the XR space, and a second plurality of positions, chosen at random except for excluding the spawn position. The logic is further operable to: filter the second plurality of positions to determine a subset of positions; perform a collision analysis for each position in the subset such that a score is assigned to that position based at least in part on accessibility to that position for the virtual character beginning from the spawn position; and place the virtual item at a position in the subset having a score as high or higher than all other positions in the subset. The logic executes before user interaction with any virtual element in the XR space.

BRIEF DESCRIPTION OF THE DRAWINGS

FIG. 11 is a flowchart of a method according to some other platform connecting embodiments.

DETAILED DESCRIPTION OF EMBODIMENTS

A further understanding of the nature and the advantages of embodiments disclosed herein may be realized by reference of the remaining portions of the specification and the attached drawings.

Figure 1:
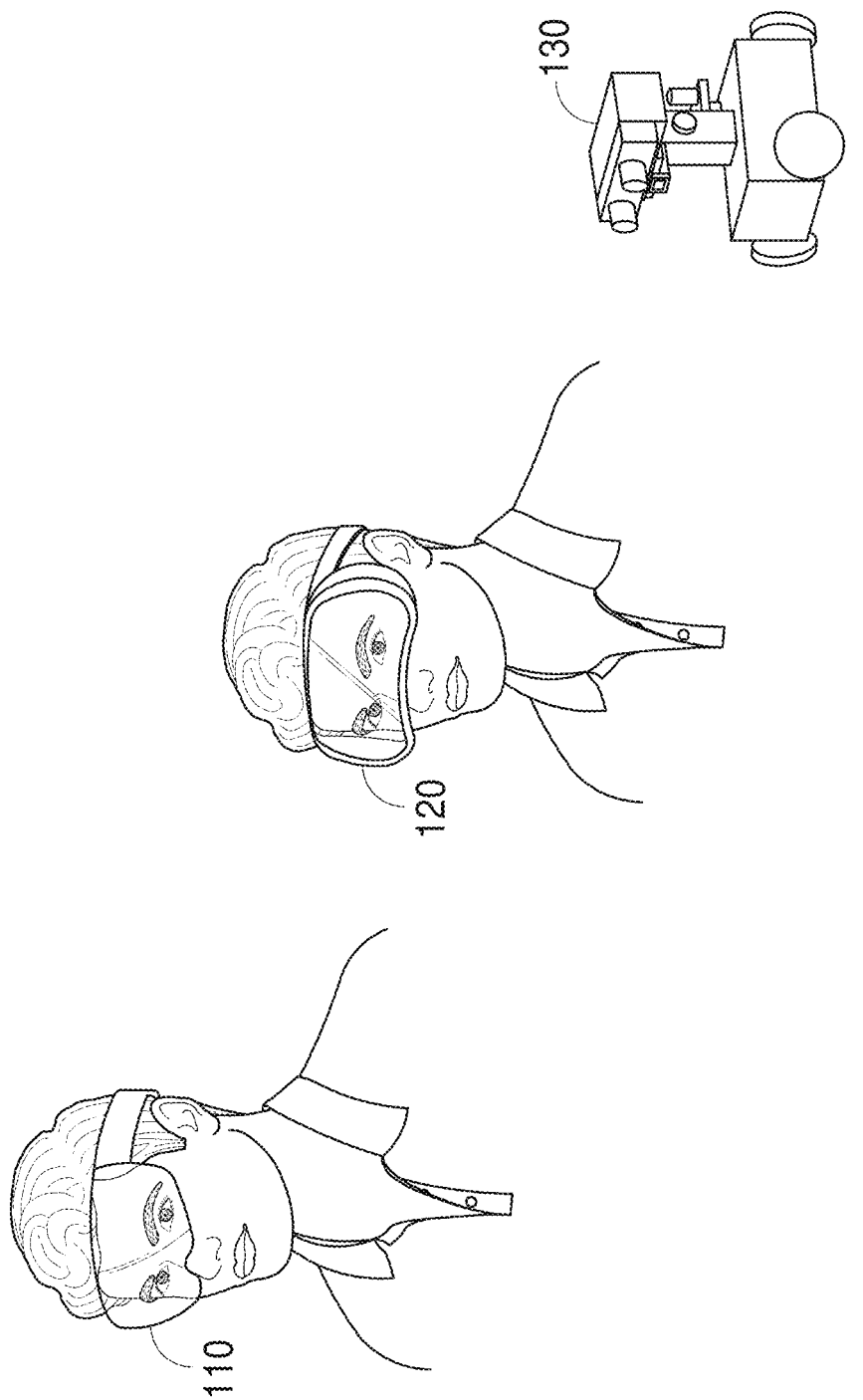
FIG. 1 (prior art) shows devices designed to generate meshes that may be used in some embodiments.

Spatial mapping meshes (SMMs) may be generated by commercially available devices manufactured by gaming and other electronic companies. The devices may be head mounted, carried in the hand, or simply deployed (for example in the form of a robot) by a user to move autonomously around the space of interest, gathering data. Technologies such as e.g., LIDAR, image analysis etc. for creating such meshes are well known and will not be discussed further herein. FIG. 1 shows two head mounted sensing and display devices, 110 and 120, and a robotic device 130, as examples of currently available devices by which SMMs can be generated. In some cases, the same devices used to generate the SMM is also used subsequently to display an XR space built on the basis of the mesh.

A typical resulting SMM is a 3D representation, in the form of enormous numbers (tens or hundreds of thousands) of relatively small 2D polygons, of all visible and tangible surfaces in a given environment, such as within a house, in advance of the user commencing an XR game in a part of that environment, such as within one room of that house. By detecting and showing surfaces of all the physical elements within the house, and therefore within and around the room of interest, open spaces between elements may, of course, be inferred, as will be discussed below.

Figure 2:
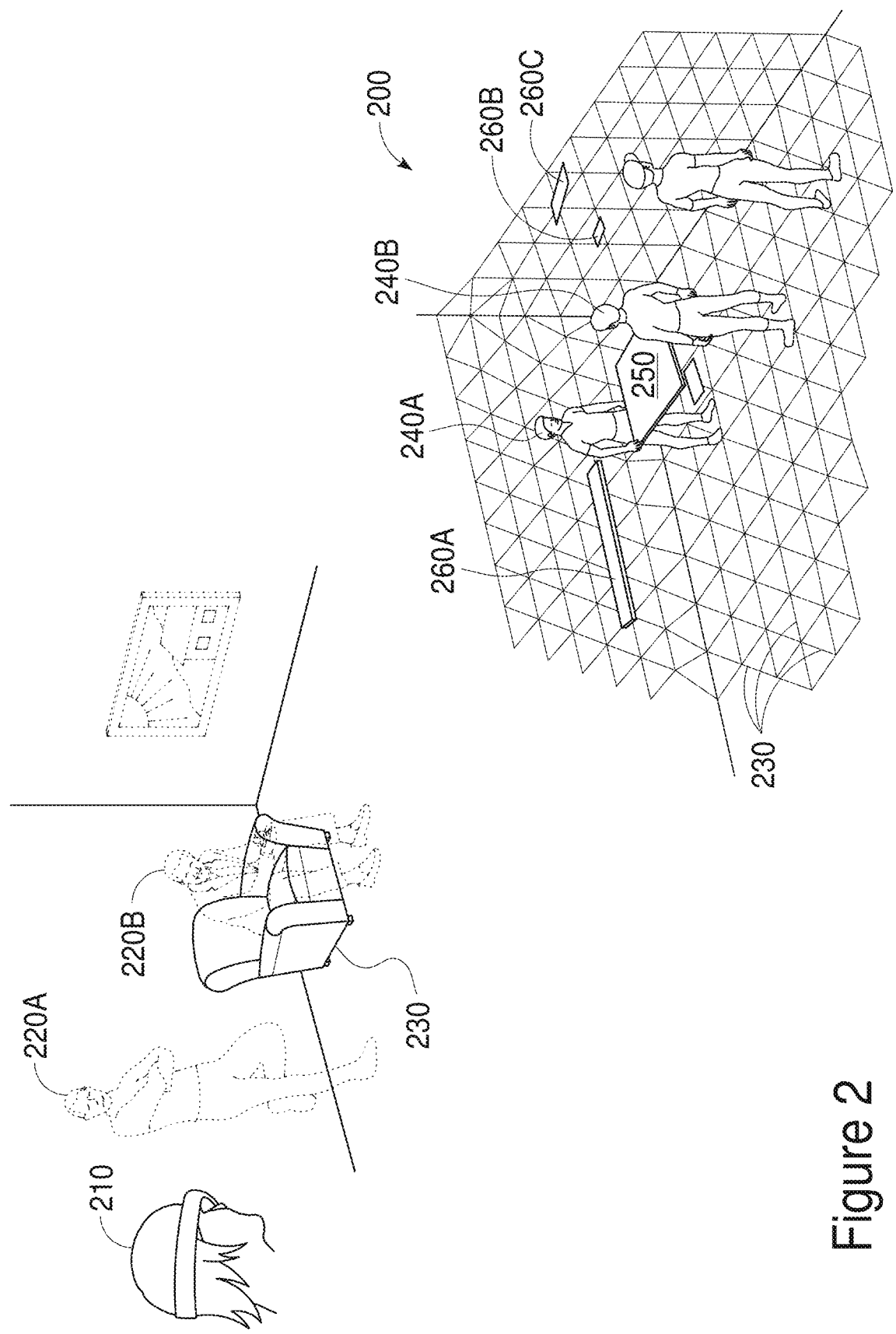
FIG. 2 illustrates two examples of XR environments in which virtual characters are visible, in seemingly natural attitudes and interactions with real elements present therein, according to some activity zone embodiments.
Figure 3:
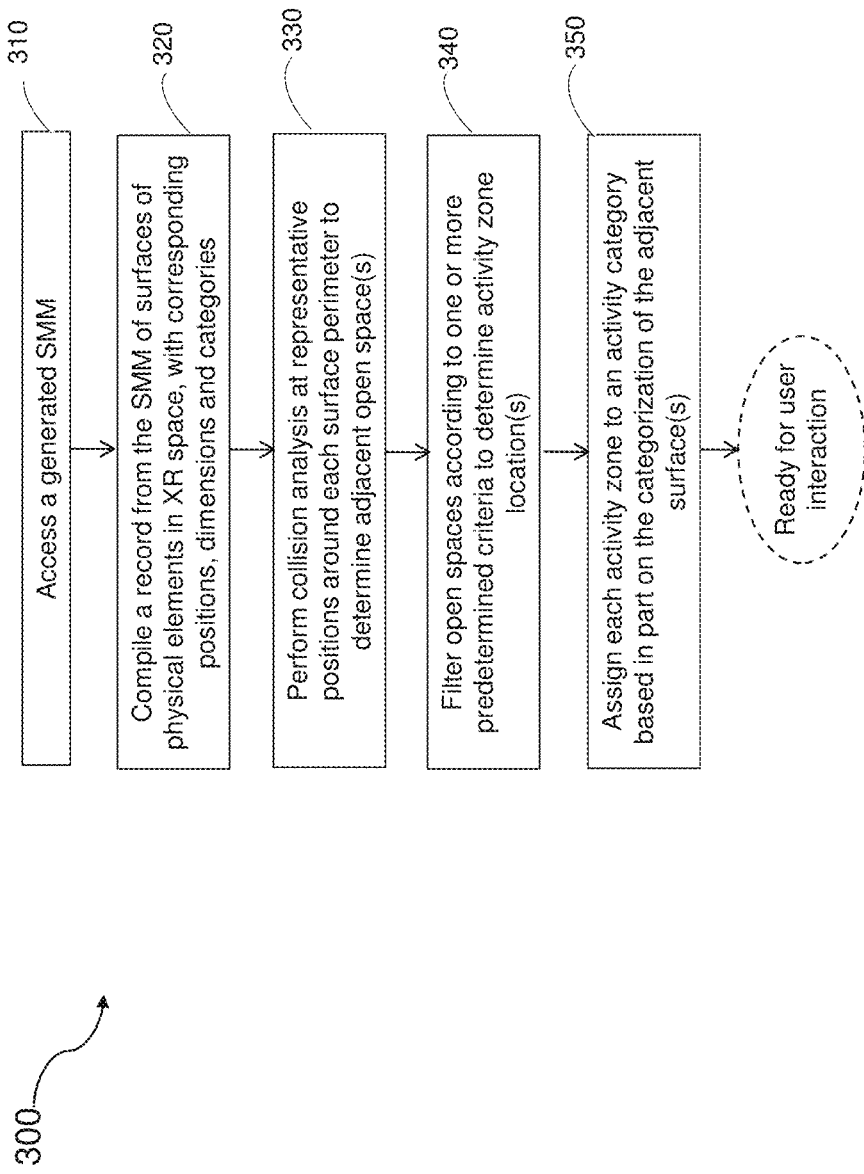
FIG. 3 is a flowchart of a method according to some activity zone embodiments.
Figure 4:
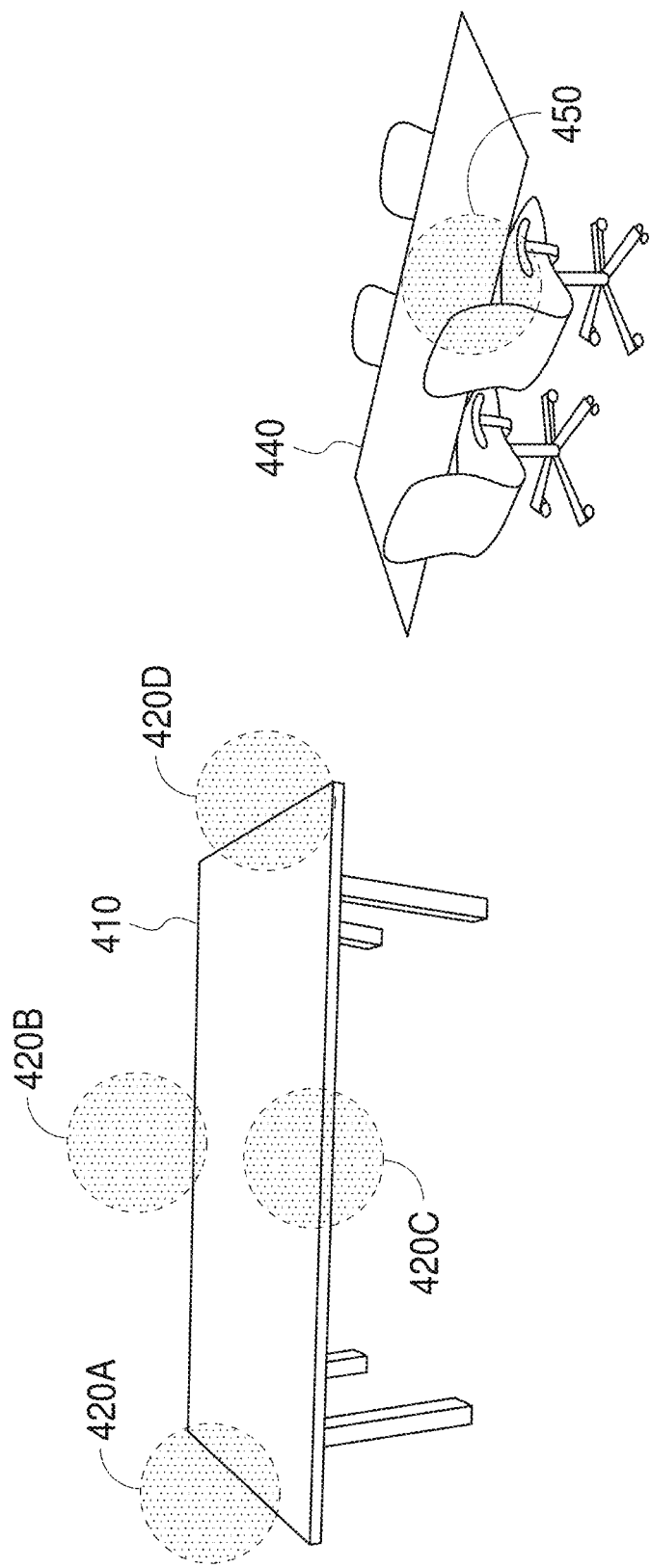
FIG. 4 illustrates locations of activity zones in relation to real elements in two examples of XR environments, according to some activity zone embodiments.

FIGS. 2-4 relate to "activity zone" embodiments.

FIG. 2 illustrates how some activity zone embodiments may provide the ability to populate XR spaces, present in real environments (such as offices or living rooms containing items of furniture, personal possessions etc) with virtual characters interacting relatively naturally with their real surroundings.

In the example shown at the left of the figure, user 210 wearing a head-mounted display to interact with the XR space is able to see one virtual character 220A in a casual leaning stance against a real wall, while another virtual character 220B is in a seated stance in a real chair 230 straight ahead of user 210, while looking off to the side, watching a virtual TV. The corresponding embodiments of the methods and systems of this disclosure must have designated some space adjacent the left wall as an activity zone suited for a character like 220A to lean against, and space above and to the front of chair 230 as an activity zone suited for a character like 220B to sit in.

The example shown at the right of the figure represents a scene that will be made visible to a user (not shown for simplicity) when interacting with XR space 200, except that the user will not see the SMM mesh itself, roughly represented in the figure by hatching 230 for explanatory purposes only.

As noted above, the spatial mapping mesh 230 covers surfaces of all the real physical elements within XR space 200, not just the floor and other surfaces visible in the figure, but also internal boundary surfaces (such as the ceiling and vertical wall surfaces) and other surfaces of furniture regardless of angular orientation. Only part of SMM 200 is shown in FIG. 2, for clarity. Typically an SMM will include other rooms, hallways, staircases etc throughout the house, but only the part within a particular room are considered for the present purposes.

Some surface areas corresponding to groups of polygons that SMM 230 reveals as representing horizontal surfaces of real objects in the space are shown in white, including table 250 and shelves or tops of cupboards 260A-C. Virtual characters 240A and 240B are shown, standing on what appears to be a realistic floor level, at opposite sides of table 250, facing each other, as if playing some sort of game together across the table. At some other point during game action, one of the virtual characters may put some object down on shelf 260A. The third virtual character in the scene is wearing headphones, and gesturing; possibly at some other point during game action, they may reach up to touch one of the surfaces 260B or 260C in their vicinity.

In this example, corresponding embodiments of the methods and systems described in this disclosure must have designated two spaces at opposite sides of table 250 as activity zones suited to a pair of virtual characters to stand at, face each other, and play a game, and may have designated spaces at and above the shelves and cupboard tops 260A-C as activity zones suited for a virtual character to position virtual objects on, or remove virtual objects from.

The examples in FIG. 2 obviously represent very few of the types of activity zone possibilities that may readily be envisaged.

FIG. 3 is a flowchart illustrating steps of method 300 according to some activity zone embodiments of the present invention, for the type of scenarios shown in FIG. 2.

At step 310, a Spatial Mapping Mesh (SMM), previously generated using at least one of the devices discussed above is obtained, containing information on locations of myriad tiny portions of each exposed surface in the environment probed by the device. The SMM is intrinsically limited to exposed surfaces, in the sense that only surfaces that are detectable by the technology used by the mapping device in question can be included.

At step 320, a record is complied using information in the SMM of those exposed surfaces of all the physical elements in XR space, in terms of the surfaces' positions, dimensions, and probable categories (such as tabletop, chair, floor cushion, countertop, and wall). In some cases, the record may then be filtered in an optional step (not shown in the figure) to remove surfaces of area smaller than a given threshold (possibly using different thresholds for different categories) to limit the rest of the method to relatively large items whether of furniture, like sofas or dining tables, or structural elements like floors, walls, or steps.

Next, at step 330, a collision analysis is performed at one or more representative positions around a perimeter of each recorded surface to determine an available open space adjacent that representative position. The collision analysis typically involves three sub-steps—first, generating a virtual collider block shaped and sized according to properties of one or more virtual object with which the XR space will be populated when the user subsequently plays an XR game (or engages in some other XR application of interest); second, scanning the virtual collider block outward from the perimeter of the surface; and third, recording a distance from the representative position to a barrier location, that being a location at which the virtual collider block collides with an adjacent physical element in the XR space. That distance may then be taken as a measure of the available open space adjacent that representative position for that particular recorded surface.

Positions around a surface perimeter are "representative" if they are considered appropriate given the size, category, and location of the surface relative to other nearby surfaces. Take the case illustrated on the left hand side of FIG. 4, for example, of a medium sized rectangular tabletop 410, free of clutter, located in the middle of a room as opposed to being directly against a wall. A reasonable set of representative points may be the center points of each of the four tabletop edges. A larger rectangular tabletop might have four additional representative position, one at each corner, while a small circular one might have just four, spaced at 90 degrees angular separation around the circular edge.

A significantly smaller tabletop surface like surface 440 shown on the right of hand side of FIG. 4, however, with chairs pushed up very close to three of the four sides of the corresponding table, might only have one representative point worth considering, at the center point of the one "open" edge.

Returning to FIG. 3, at step 340, the open spaces found by step 330 are filtered according to one or more predetermined criteria to determine the location of each one that can henceforward be considered to be an activity zone. The size of the open space is one example of a possible criterion; the speed at which a character moves is another.

This filtering step is useful in eliminating spaces from further consideration if they are too small for any meaningful activity to be performed in them.

Finally, at step 350, each activity zone is assigned to at least one activity category, based in part on the category or categories of the available surface(s) bounding that activity zone. So, for example, although there may be some overlap, the set of activity categories appropriate for space around a sofa will not be exactly the same as the set of activity categories for space around a dining table. The assigning essentially matches the zone to one or more categories in a preset list.

In the context of a game designed to be played in an XR space, activity categories describe potential actions that a virtual character may carry out while interacting with real surfaces in the game.

In some simple embodiments involving a single virtual character, activity categories may include, for example, one or more of sitting, jumping up and down, climbing, kneeling, leaning, lying down, putting a virtual object on a surface or lifting one off. The type of surface and its orientation are obviously relevant, as some activities would naturally suit a low horizontal surface: kneeling would suit a floor, or a rug, for example, others like lying down might suit a sofa or a bed, while yet others like leaning might suit a wall or a vertical side of a tall bookcase.

Another factor that may be taken into account in assigning an activity zone to an activity category is the size of the surface or surfaces in the vicinity of the activity zone, the size being determined by surface dimensions which are a part of the SMM record. Yet another factor may be the size of the activity zone itself, basically the dimensions of the open space determined by the collision analysis relative to the dimensions of one or more virtual characters that might be positioned there to carry out that type of activity For example, the space needed for a large character to run around the table would be greater than the space needed for that same character to sit down at that table in a virtual chair, which in turn might be greater than the space needed for a smaller character to sit down at that same table in a correspondingly smaller virtual chair.

Method 300 is essentially complete after step 350 has been carried out, allowing a character in an XR game (or other application) subsequently set in the XR space addressed by the method to participate in an activity appropriate to their location, in a manner that is believable to the user.

In some embodiments, a plurality of activity zones in close proximity to each other may be assigned to a group activity category involving two or more non-player character (NPCs) interacting with each other as well as with real surfaces in a video game designed to be played in the XR space. The group activity category may be one of: conversation, playing a multi-player card game, throwing and catching a ball, and sharing a platter of food.

In some other embodiments, the group activity category may involve interaction with more than one available nearby surface. For example, one character may pick up virtual darts from a surface of a real table, and throw them at a virtual dartboard on a real wall, while another player near the wall pulls the darts out and returns them to the table.

Returning to FIG. 4, the left hand part shows a part of an XR space where method 300 has been used to determine four activity zones 420A-420D, shown as grey circular blobs, each located at or near one of the four side edges of tabletop 410. Note that these blobs are not actually shown to the user during game play, but are useful aids to the game designer during game development. As mentioned above, as these zones are clustered around a single surface that is recognized to be a tabletop, they may be assigned together to one or more group activity categories, like playing a multi-player card game, or having a group discussion over a meal. The right hand part of the figure shows a situation where three of the four sides of another tabletop 440 are effectively blocked by chairs, so the only area which could be defined as an activity zone is area 450, again shown as a grey circular blob.

It should be noted that neither a representative graphical indication of position (like the grey blobs shown in FIG. 4) nor virtual boundaries of the corresponding activity zone itself will actually be made visible to the user during XR game play.

Figure 5:
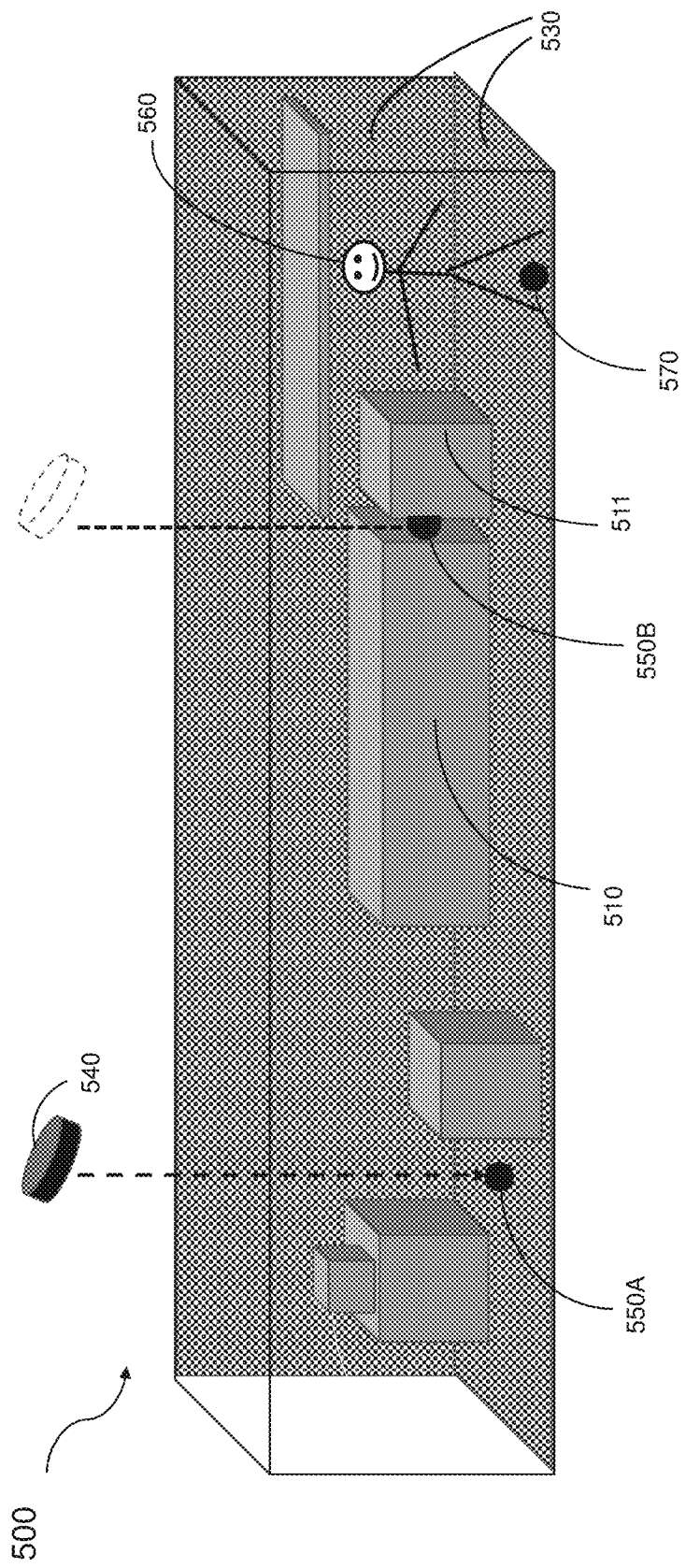
FIG. 5 illustrates an example of an XR environment in which virtual items may be placed quasi-randomly according to a reachable item placement set of embodiments.
Figure 6:
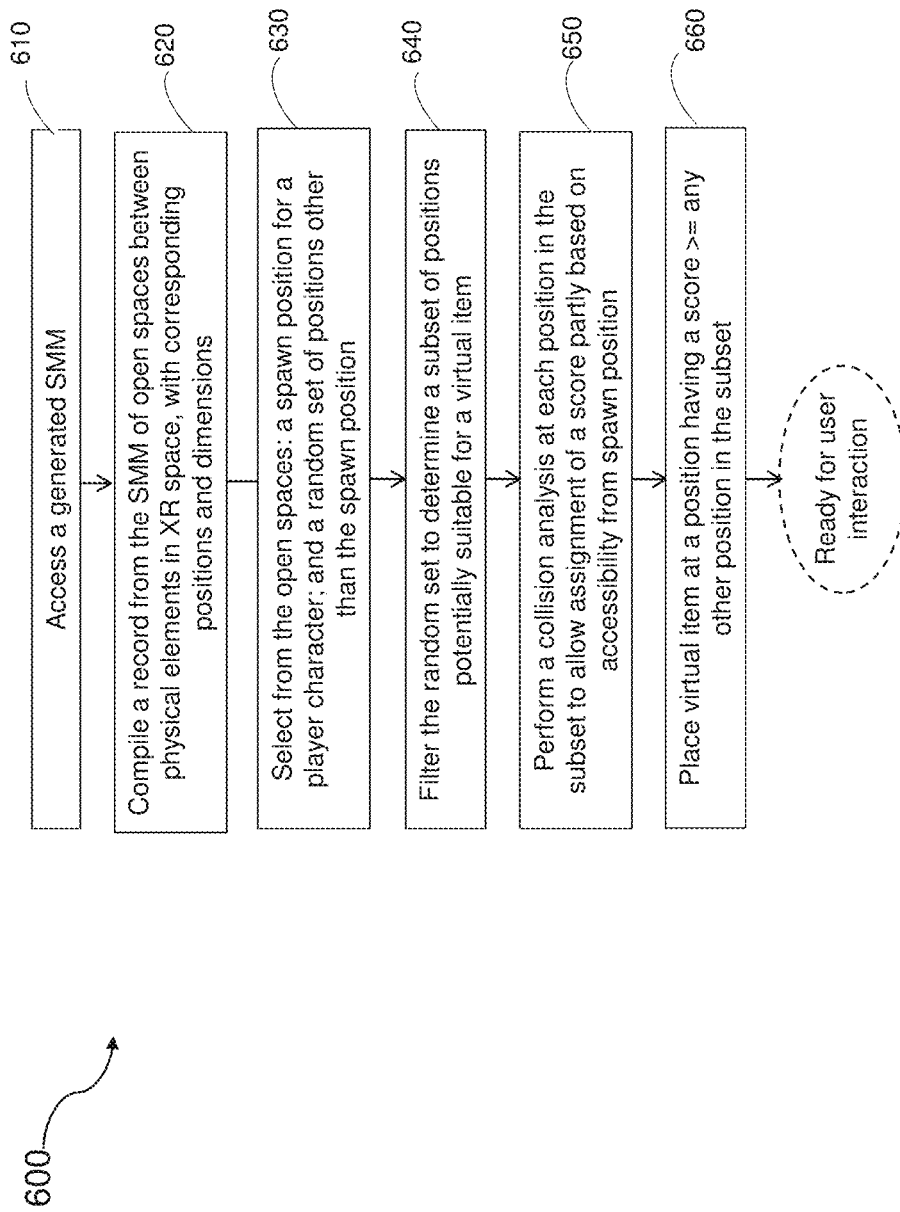
FIG. 6 is a flowchart of a method according to some reachable item placement embodiments.
Figure 7:
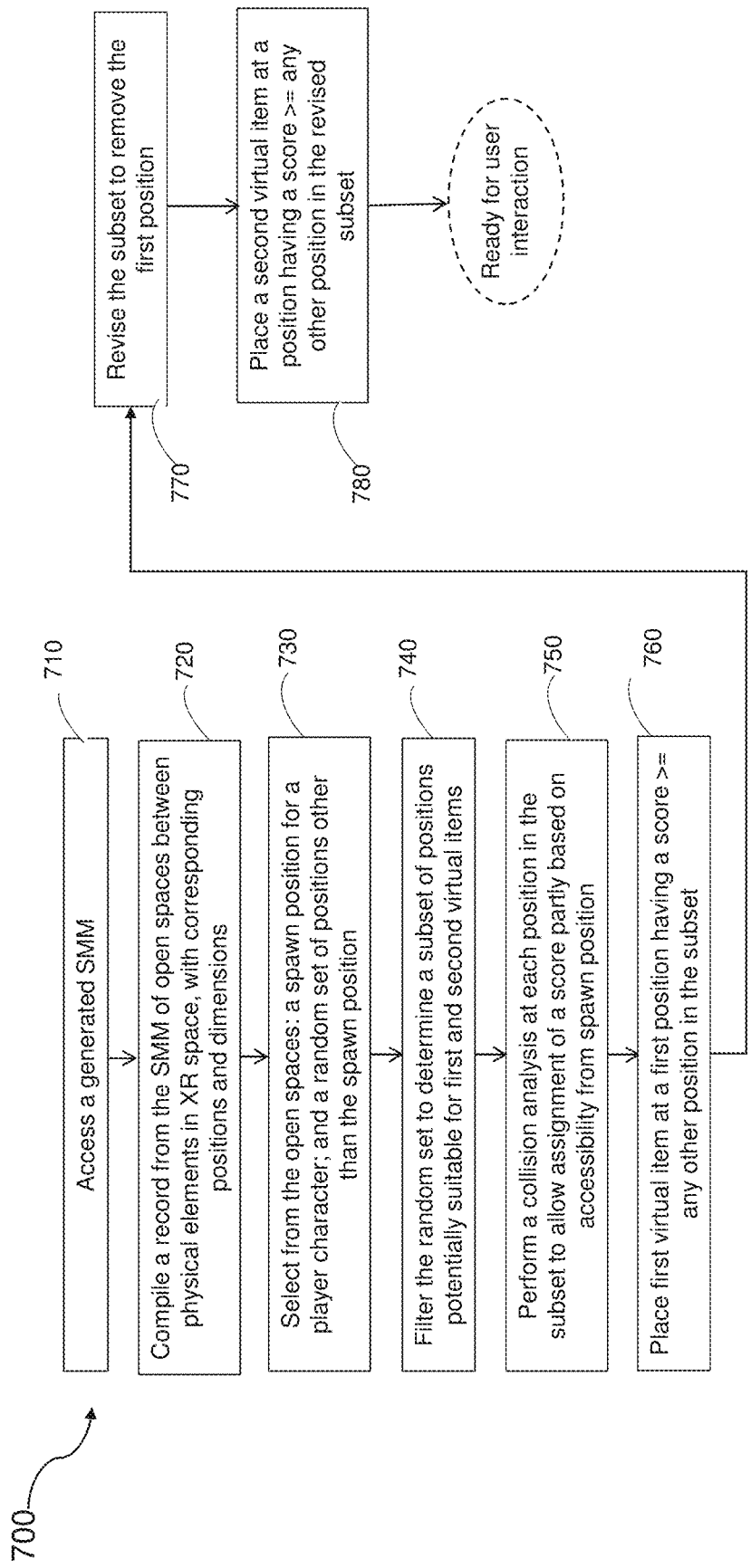
FIG. 7 is a flowchart of a method according to some other reachable item placement embodiments.

FIGS. 5-7 relate to "reachable item placement" embodiments.

FIG. 5 illustrates how some of these embodiments may allow for XR spaces, present in real environments such as simple living rooms containing typical items of furniture, may be populated with virtual items so that a virtual character may subsequently be able to "discover"[2] them, and find a path to reach them from whichever "spawn" position the character finds themselves at, as a starting point.

Specifically, the example illustrated by FIG. 5 is an XR space 500 in a room filled with physical elements (crudely represented here as cuboids for simplicity) such as 510 and 511. Spatial mapping mesh 530 should be understood as covering all exposed surfaces of the elements in the XR space, although, for clarity, the mesh polygons are only indicated by hatching at two representative surface, the back wall and the floor. The virtual item 540 to be placed in advance of the game being played is shown as being cylindrically shaped, with an aspect ratio that suggests a coin, but of course this is just one example; Position 550A is one possible position in which item 503 could reasonably be placed, to potentially be able to be accessed by virtual character 560 from spawn position 560. Position 550B, however, although in an unoccupied space between real physical elements 510 and 511 might not be a reasonable position to be placed if it is sufficiently far back (relative to front surfaces of 510 and 511 as viewed by character 560) that character 560 could not be expected to reach it.

[2] This typically involves use of raycast, a technique well known in the art.

FIG. 6 is a flowchart of method 600 according to some reachable item embodiments of the present invention, for the type of scenarios shown in FIG. 5.

At step 610, a Spatial Mapping Mesh (SMM), previously generated using at least one of the devices discussed above is obtained, containing information on locations of myriad tiny portions of each exposed surface in the environment probed by the device. The SMM is intrinsically limited to exposed surfaces, in the sense that only surfaces that are detectable by the technology used by the mapping device in question can be included.

At step 620, a record is complied, using information in the SMM, of all open spaces between those surfaces of physically real elements in the XR space, with corresponding positions and dimensions.

At step 630, a spawn position that would be suitable for the virtual character in the subsequent game is selected from the record of open spaces (where suitability is based on the character's size, and possibly skill and ability levels); and some primary positions other than the spawn position are selected from that same record, at random other than excluding the spawn position. The order is immaterial—in some embodiments the primary positions might be chosen before the spawn position is.

At step 640, a filtering operation is carried out on the open spaces corresponding to the selected primary positions to yield a subset of positions potentially suited to a placement location for the virtual item. This typically comprises applying a size threshold to exclude open spaces too small to comfortably accommodate the virtual item, although other constraints may be added to keep the number of positions in the subset to a manageable number or for other reasons discussed below.

At step 650, a collision analysis is carried out at each position in the subset of positions, allowing a score to be assigned based at least in part on accessibility to that position for the virtual character beginning from the spawn position. Another factor that may affect the score in some embodiments is excessive distance from the spawn position. In some embodiments, the analysis comprises, for each position in the subset, generating a virtual collider block shaped and sized according to size and shape of the first virtual item, moving a virtual collider block along all possible paths from the spawn position to that position and recording all collisions with real surfaces along those paths.

At step 660, if one position in the subset has a higher score than any other, the virtual item is placed at that position, while if there are two or more positions that tie for the highest score, the virtual item is placed at one of those two or more positions, randomly or on the basis of some other criterion. One possible criterion that may be used is one based on the desired level of difficulty for the game—a position much higher or much lower than eye level for the character may be considered more difficult than the others, for example.

Method 600 is essentially complete after step 660 has been carried out, allowing a character in an XR game (or other application) subsequently set in the XR space addressed by the method to reach a virtual item placed in the position defined by the method, in a manner that is believable to the user. There are many games that challenge a character, in particular a virtual character, to "search for" a virtual item and take it. Doing this in an XR environment, where the item is positioned in a space between real physical items seen by the user may be particularly satisfying to the user.

In some instances of these "collector" games, there may be a plurality of virtual items for the character to find and pick up, with the goal being to collect as many as possible, maybe in a given time, and/or in competition with other characters. For these games, a variation of method 600 is needed, such as method 700 illustrated by FIG. 7.

Steps 710, 720, 730, 740, 750, and 760 of method 700 correspond almost exactly to steps 610, 620, 630, 640, 650 and 660 of method 600, but applied to a situation where there are two virtual items to be placed rather then one. At step 760, for example, just one of the two items is placed at the position that has been determined by the collision analysis of step 750 to have the highest score (or at one of two or more positions which tie for that highest score) as described above for the single virtual item embodiments of FIG. 6.

At step 770, the subset of positions for which a score has been determined at step 750 (in the same way described above for step 630 of method 600) is then revised to remove the position at which the first virtual item was placed. Then at step 780, the second virtual item can be placed at whichever position in the revised subset has been determined by the collision analysis of step 750 to have the highest score (or at one of two or more positions which tie for that highest score) compared to all other positions in that revised subset.

In some embodiments the revision step 770 may exclude other positions as well as the position at which the first virtual item was placed. For example, it may exclude other positions that are closer to the first position than a predetermined distance, so that the challenge to the character is kept within a desired difficulty range.

For simplicity, in method 700 it is assumed that the two virtual items are of the same size though it may readily be appreciated that the details of filtering step 740 may include different filters for embodiments in which the two items are of different sizes.

It should be apparent that additional steps following the pattern of steps 770 and 780 may be added as needed for embodiments requiring successively greater numbers of placement locations to be found for correspondingly greater numbers of virtual items.

In some multi-item embodiments, more complex strategies may be involved in choosing placement locations beyond the primary criterion of "highest score". For example, one embodiment might deliberately choose a mixture of "easy to access" locations and "hard to access" locations, and adjust the ratio of easy to hard depending on a desired difficulty level for the game for a given user, or a particular occasion. In these cases, at least some locations that are not the highest scoring may be chosen for placement positions.

In some cases, it may be desirable to try to present users in different XR spaces with game experiences that are of roughly equal difficulty. One way of doing this might be to adjust the number of virtual items placed according to the size of the XR space, or to the density of real surfaces present. Another strategy might be to avoid placing virtual items so close together that finding one would almost certainly mean finding the others, by imposing a "minimum separation" threshold between placing the nth virtual item and the (n+1)th virtual item. Many other variations may be envisaged by those of ordinary skill in the art of game design.

FIGS. 8-11 related to platform connecting embodiments.

Figure 8:
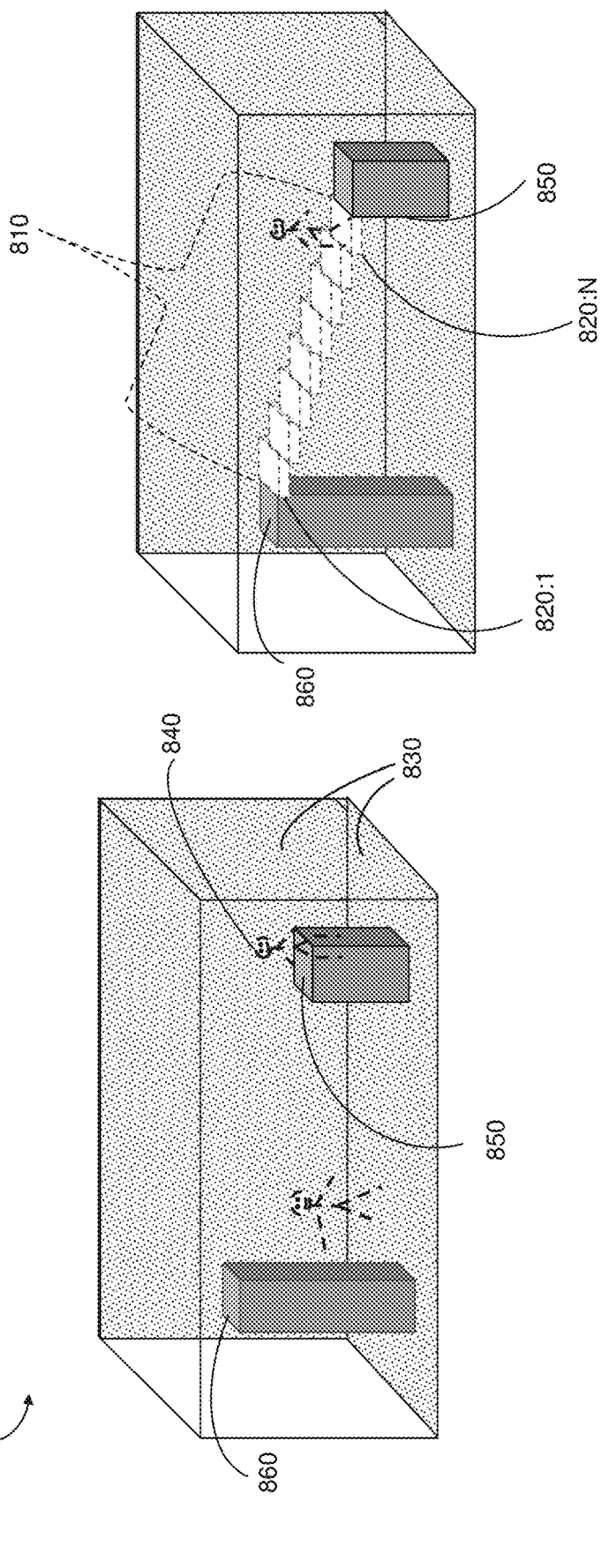
FIG. 8 illustrates an example of an XR space, showing how a virtual character might benefit from access to a virtual staircase, positioned according to platform connecting embodiments.

On the left hand side of FIG. 8 is an example of an XR environment in which a virtual character would benefit by having access to a virtual staircase, positioned according to platform connecting embodiments. Only some parts of a Spatial Mapping Mesh 830 are shown by hatching on surfaces of the right hand wall and the back wall of the XR space 800, but as in the cases discussed above of space 500 in FIG. 5, surfaces of all physical elements within space 800 would actually be covered by that mesh. Consider the situation where virtual character 840 might want to reach the top surface 860 of a physical object in the room, shown as a simple cuboid here, for simplicity. If the character were standing on the floor right next to the object, the height of surface 860 above floor level would be too great for the character to reach it by jumping or climbing. Similarly, if character 840 were able to reach a top surface 850 of another, nearby object in the room (the horizontal separation is exaggerated for clarity in the figure), the vertical separation between 850 and 860 might still be too great for any efforts on the part of character 840 to traverse, left to their own devices. Now see the right hand side of FIG. 8 where the same XR space is shown, but with the addition of a virtual staircase 810, made up of N virtual blocks, 820:1 through 820:N, spanning the space between 850 and 860, making it easy for character 840 to reach either surface from the other.

Another possibility (not shown) would be to add another virtual staircase between level 860 and floor level.

Figure 9:
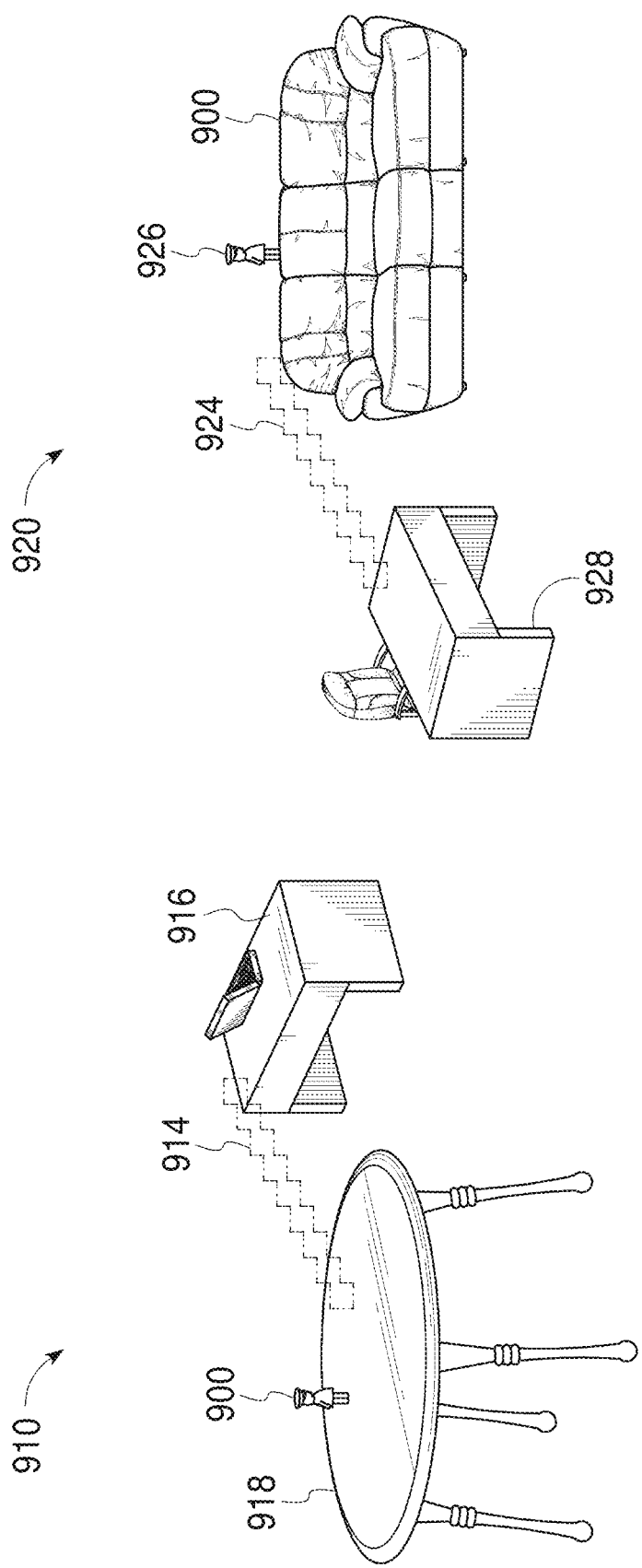
FIG. 9 illustrates examples of XR environments in which a virtual character makes use of virtual staircases previously positioned according to platform connecting embodiments.
Figure 10:
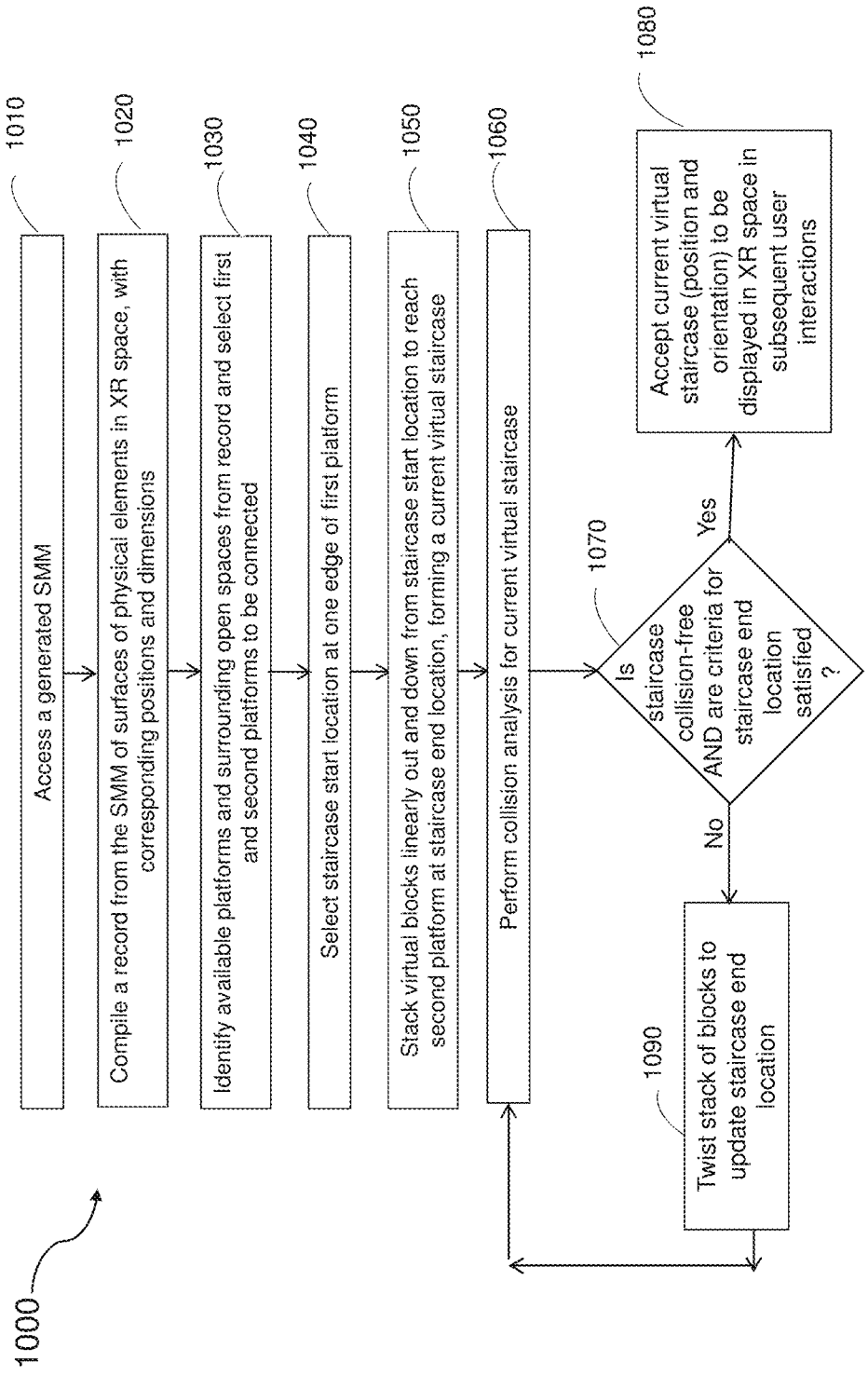
FIG. 10 is a flowchart of a method according to some platform connecting embodiments.

FIG. 9 shows two screenshots taken from an actual video game under development, where a virtual character is making their way between platforms at different levels by using virtual staircases, positioned 3-dimensionally in XR space according to embodiments of the method described below with reference to FIG. 10. On the left hand side, XR space 910 (possibly a hobby room or workshop) shows virtual character 900 who has just run down virtual staircase 914 from a real tabletop surface 916 to the top surface 918 of a real stack of drawers. On the right hand side of the figure, the same character is shown in another XR space 920 (possibly an office or living room), running along the top surface 926 of the back of a sofa, after having run up virtual staircase 924 from the top surface 928 of a desk. Virtual staircases 914 and 924 are positioned in the respective XR spaces according to embodiments FIG. 10 is a flowchart of method 1000 according to some platform connecting embodiments of the present invention, relevant to scenarios such as those illustrated in FIGS. 8 and 9.

At step 1010, a Spatial Mapping Mesh (SMM), previously generated using one of the devices discussed above is obtained, containing information on locations of myriad tiny portions of each exposed surface in the environment probed by the device. The SMM is intrinsically limited to exposed surfaces, in the sense that only surfaces that are detectable by the technology used by the mapping device in question can be included.

At step 1020, a record is complied, using information in the SMM, of surfaces of real physical elements in the XR space, with corresponding positions and dimensions.

At step 1030, available platforms and surrounding open spaces are identified from the record, and first and second platforms that are good candidates to be connected are selected. The selection includes selecting a first platform at a first level and a second platform at a second level, wherein the first level is higher than the second level by a separation greater than a predefined threshold. This avoids spending resources on creating staircases that a virtual character in an XR game likely to be played in the XR space would not really need, as they could step or jump from one to the other without the extra help. In some embodiments, the predefined threshold is determined by at least one known characteristic of the virtual character, such as their height and jumping ability.

In some embodiments, the selection may include filtering out platforms too small or too uneven to be worth considering, platforms that would be indirectly accessible to the character as they are close enough to others that are directly reachable, and so on.

At step 1040, a staircase start location is selected at one edge of the first platform, closest to the nearest edge of the second platform. This will typically be at a central point between adjacent corners of the platform, but the process involves choosing a location subject to predetermined criteria, aimed at ensuring there is adequate access to that location for a character that may need it. In some embodiments, the criteria amount to requiring that, at that location: a volume of available open space must be greater than a predetermined volume; and that an available open entry path from, or exit path to, other available open spaces in the XR space exists. Typically, the predetermined volume is determined in part by dimensions of a user-controlled character in a video game designed to be played in the XR space. In some embodiments, the predetermined volume may be determined in part by flexibility or dexterity characteristics of that character.

In some embodiments, the existence of an available open entry path or exit path is determined by performing a collision analysis at that location. Performing a collision analysis at that location typically comprises: generating a virtual collider block shaped and sized according to dimensions of a user-controlled character in a video game designed to be played in the XR space; scanning the virtual collider block outward, relative to a corresponding surface edge, from that location; and recording a distance from that location to a barrier location at which the virtual collider block collides with an adjacent physical element in the XR space. The recorded distance can be taken as determining the available open space adjacent that representative position. If it is larger than a predetermined threshold for the character anticipated as needing to use that space, an open entry or exit path can therefore be assumed.

At step 1050, virtual blocks are stacked in a linear staircase formation, beginning at the top with a first block positioned at the staircase start location, continuing with a second block offset along outwards along a direction perpendicular to the edge of the first platform and so on, until a last virtual block contacts the second platform at a staircase end location. This creates a current version of a virtual staircase.

At step 1060, a collision analysis is carried out for the current virtual staircase, to check for the presence of any intervening real surfaces overlapping or too close to the staircase. The analysis would preferably take a dimension (typically the height) of a character that might use the staircase in a subsequent XR game into account, to make sure there is adequate free space to allow that use.

At step 1070, if no collisions are detected along the extent of the virtual staircase, and if the staircase end location satisfies the same predetermined criteria used at step 1040 for the staircase start location. the method proceeds to step 1080 at which the current virtual staircase is accepted, meaning that the connected group of virtual blocks will be displayed at its current positioning and orientation, connecting the first and second platforms. in subsequent user interactions with the XR space.

In some other embodiments, not shown, the predetermined criteria may be different at the two ends of the staircase.

In cases where, at step 1070, it is found that there are collisions or that the staircase end location criteria are not satisfied (or both), the method proceeds to step 1090 rather than 1080, and a twist or spin in applied to the connected virtual blocks, updating the staircase orientation and the positioning of the bottom end of the staircase, before step 1060 is performed for a second time. If it is then determined at the next path through step 1070 that the twisted orientation is free of collisions and has produced an updated potential staircase end location that satisfies the predetermined criteria, the method proceeds to 1070, and the current (updated) staircase is accepted, as discussed above. If it has not, further iterations are performed, each with a corresponding new twist.

FIG. 11 is a flowchart of method 1100 according to some other platform connecting embodiments of the present invention, relevant to the same type of scenarios illustrated in FIGS. 8 and 9.

Steps 1110 through 1180 correspond exactly to steps 1010 through 1070 of method 10. The difference occurs at step 1190, which is only reached if it is determined at step 1170 that either a collision occurs or the criteria applied to the staircase end location are not met (or both). In that case, rather than twisting the staircase blocks, a straight linear orientation is maintained but the staircase itself is shifted to update the staircase start location to a new location on an edge of the first platform (which in turn would update the staircase end location). The shift may be a small one, to a different location along the same platform edge, or a more extensive one to a location at a different edge of the same platform. The predetermined criteria used at step 1140 (corresponding to 1040 in method 1000 discussed above) would of course have to be satisfied in making the shift. Then steps 1160 and 1170 are performed for a second time. If the shifted orientation has produced a collision free staircase and an updated staircase end location that satisfies the predetermined criteria, the method proceeds to 1180, and the current (updated) staircase is accepted, as discussed above with respect to 1080 in method 1000. If a collision is detected or if the end location of the shifted staircase does not satisfy the criteria, further iterations are performed, each with a corresponding new shift.

Various combinations of methods 1000 and 1100 may be envisaged, such as, for example, one type where a fixed number of twisted orientations are attempted before, if necessary, the same number of shifted orientations are. In some embodiments, the fixed number may be one, meaning that each twisted orientation may be followed by a shifted and back again, for as many iterations as necessary to find an updated staircase end location that satisfies the predetermined criteria so that the corresponding virtual staircase can be accepted.

In yet other embodiments, instead of settling on the first virtual staircase whose end location is found to satisfy the predetermined criteria, the method may continue in the hope of finding two or more virtual staircases that satisfy the predetermined criteria. In these cases, a choice will be made of one of the two or more virtual staircases on the basis of some additional criterion, such as whichever one has a start location with the largest volume of open space around it.

It should be noted that although much of the above discussion of platform connecting embodiments has concerned building virtual staircases from the top down, with the first level being above the second level, of course the same basic ideas could be applied in the opposite sense, building virtual staircases from a lower level to an upper one.

It should also be noted that while this disclosure focuses on cases where the two platforms are at different vertical levels, the inventive ideas discussed herein could readily be adapted and extended to cover situations where a gap between two platforms is too large for the character to step or jump across, so that a substantially horizontal bridge rather than a staircase could be a good solution. Essentially the same considerations of choosing suitable start and end locations with adequate access, avoiding collisions with nearby surfaces etc. would apply to such bridge embodiments, requiring essentially corresponding method steps to those discussed for the staircase embodiments.

Embodiments of the present invention provide many benefits. In general terms, methods described above allow a user of an XR environment, which may be a room in the user's home or business premises in which the methods were applied prior to the user playing the XR game (or using another XR application of interest) to experience a greater sense of immersion in that XR environment than would otherwise be achieved.

In those instances where the methods are applied to find and categorize activity zones, virtual characters in the XR environment can be presented carrying out believable actions with respect to real elements present in the environment, even though the developer of the XR game (or other XR application) would have had no knowledge at all of what (or where exactly) real elements would actually be present in that particular user's surroundings.

In those instances where the methods are applied to find placement positions from which virtual items may be collected by a virtual character, that character—or rather the real user—may find the task less frustrating and more satisfying and engaging than if the positions were randomly distributed through XR space without regard to the real elements actually present.

In those instances where the methods are applied to find start and end locations for virtual staircases, a virtual character who would otherwise be unable to traverse spaces between a pair of real platforms at different levels in an XR space is enabled to do in a believable, relatively natural way, again increasing user engagement and immersion in the XR environment.

The methods disclosed are computationally efficient, in taking pains to reduce the volumes of data being processed to focus on the most relevant regions of space within the XR space as a whole. In many activity zone embodiments, for example, the collision analysis may only be carried out in the immediate surroundings of relatively large surfaces, most likely to be of interest, rather than addressing every single open space identified in the SMM. For some reachable item embodiments, the filtering step before the collision analysis may exclude open spaces too large or too small to be good hiding places, and in some platform connecting embodiments, a starting position too close to an alternative existing route between platforms may be eliminated during the initial selection step of the staircase predefining method.

As noted earlier, the present invention is not limited to games alone. Relatively straightforward examples of non-gaming applications include navigation, shopping, and apps involving chatting with virtual characters, but other more speculative examples may be envisaged, such as (1) determining how connectable surfaces are to each other and the floor to assess how cluttered a room is and/or how navigable it is to a child of a particular height, a person with disabilities; (2) more directly helping users with disabilities navigate a particular space; and (3) trajectory planning and control for drones.

Although the description has been described with respect to particular embodiments thereof, these particular embodiments are merely illustrative, and not restrictive.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general-purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used.

Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

A "processor" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. Examples of processing systems can include servers, clients, end user devices, routers, switches, networked storage, etc. A computer may be any processor in communication with a memory. The memory may be any suitable processor-readable storage medium, such as random-access memory (RAM), read-only memory (ROM), magnetic or optical disk, or other non-transitory media suitable for storing instructions for execution by the processor.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A method for quasi-random placement of a virtual item in an extended reality (XR) space; the method comprising:
    accessing a previously generated spatial mapping mesh (SMM) in which the XR space is defined, the SMM including surfaces of physical elements present in that space;
    compiling a record from the SMM of a first plurality of open spaces between the surfaces, with corresponding positions and dimensions;
    selecting from the first plurality of open spaces:
    a spawn position for a virtual character in a video game designed to be played in the XR space; and
    a second plurality of open space positions, chosen at random except for excluding the spawn position;
    filtering the second plurality of open space positions to determine a subset of positions;
    performing a collision analysis for each position in the subset such that a score is assigned to that position based at least in part on accessibility to that position for the virtual character beginning from the spawn position; and
    placing the virtual item at a position in the subset having a score as high or higher than all other positions in the subset;
    wherein the method is carried out before user interaction with any virtual element in the XR space.

2. The method of claim 1, wherein the SMM was generated by a device worn, carried, or deployed by a user of XR video games.

3. The method of claim 1, wherein performing a collision analysis for a position in the subset comprises:
    generating a virtual collider block shaped and sized according to size and shape of the virtual item;
    moving the virtual collider block along all possible paths from the spawn position to that position; and
    recording all collisions with real surfaces along the paths.

4. The method of claim 3, wherein if there is no travel path between the spawn position and a position in the subset which is not blocked by at least one surface, blocking being determined by relative dimensions of that surface and the virtual character, the score for that position is minimized, preventing that position from being chosen for placement of the virtual item.

5. The method of claim 1, wherein the score assigned to a position depends at least in part on at least one of a set of predetermined criteria comprising: flexibility of the virtual character, dexterity of the virtual character, height above ground level of the position relative to reach of the virtual character, and dimensions of an available open space adjacent the position.

6. The method of claim 1, wherein the video game includes a challenge for the virtual character to retrieve the virtual item from wherever it has been placed.

7. A method for quasi-random placement of first and second virtual items of equal size in an extended reality (XR) space; the method comprising:
accessing a previously generated spatial mapping mesh (SMM) in which the XR space is defined, the SMM including surfaces of physical elements present in that space;
compiling a record from the SMM of a first plurality of open spaces between the surfaces, with corresponding positions and dimensions;
selecting from the first plurality of open spaces:
a spawn position suitable for a virtual character in a video game designed to be played in the XR space; and
a second plurality of open space positions, chosen at random except for excluding the spawn position;
filtering the second plurality of of open space positions to determine a subset of positions;
performing a collision analysis for each position in the subset such that a score is assigned to that position based at least in part on accessibility to that position for the virtual character beginning from the spawn position;
placing the first virtual item at a first position in the subset having a score as high or higher than all other positions in the subset;
revising the subset to exclude the first position; and
placing the second virtual item at a second position in the revised subset having a score as high or higher than all other positions in the revised subset;
wherein the method is carried out before user interaction with any virtual element in the XR space.

8. The method of claim 7, wherein the SMM was generated by a device worn, carried, or deployed by a user of a video game designed to be played in XR environments.

9. The method of claim 7, wherein performing a collision analysis for a position in the subset comprises:
generating a virtual collider block shaped and sized according to size and shape of the first virtual item; and
moving the virtual collider block along all possible paths from the spawn position to that position; and
recording all collisions with real surfaces along the paths.

10. The method of claim 7, wherein if there is no travel path between the spawn position and a position in the subset which is not blocked by at least one surface, blocking being determined by relative dimensions of that surface and the virtual character, the score for that position is minimized, preventing that potential placement location from being chosen for placement of either the first or section virtual items.

11. The method of claim 7, wherein the score assigned to a position depends at least in part on at least one of a set of predetermined criteria comprising: flexibility of the virtual character, dexterity of the virtual character, height above ground level of the position relative to reach of the virtual character, and dimensions of an available open space adjacent the position.

12. The method of claim 1, wherein the video game includes a challenge for the virtual character to retrieve at least one and preferably both of the first and second virtual items from their corresponding placement locations.

13. A system for quasi-random placement of a virtual item in an extended reality (XR) space defined within a real environment; the system comprising:
one or more processors; and
logic encoded in one or more non-transitory media for execution by the one or more processors and when executed operable to:
access a previously generated spatial mapping mesh (SMM) in which the XR space is defined, the SMM including surfaces of physical elements present in that space;
compile a record from the SMM of a first plurality of open spaces between the surfaces, with corresponding positions and dimensions;
select from the first plurality of open spaces:
a spawn position suitable for a virtual character in a video game designed to be played in the XR space; and
a second plurality of open space positions, chosen at random except for excluding the spawn position;
filter the second plurality of open space positions to determine a subset of positions;
perform a collision analysis for each position in the subset such that a score is assigned to that position based at least in part on accessibility to that position for the virtual character beginning from the spawn position; and
place the virtual item at a position in the subset having a score as high or higher than all other positions in the subset;
wherein the logic executes before user interaction with any virtual element in the XR space.

14. The system of claim 13, wherein the SMM was generated by a device worn, carried, or deployed by a user of a video game designed to be played in XR environments.

15. The system of claim 13, wherein performing a collision analysis for a position in the subset comprises:
generating a virtual collider block shaped and sized according to size and shape of the first virtual item; and
moving the virtual collider block along all possible paths from the spawn position to that position; and
recording all collisions with real surfaces along the paths.

16. The system of claim 13, wherein if there is no travel path between the spawn position and a position in the subset which is not blocked by at least one surface, blocking being determined by relative dimensions of that surface and the virtual character, the score for that position is minimized, preventing that position from being chosen for placement of the virtual item.

17. The system of claim 13, wherein the score assigned to a position depends at least in part on at least one of a set of predetermined criteria comprising: flexibility of the virtual character, dexterity of the virtual character, height above ground level of the position relative to reach of the virtual character, and dimensions of an available open space adjacent the position.

18. The system of claim 13, wherein a video game subsequently played in the XR space includes a challenge for the virtual character to retrieve the virtual item from wherever it has been placed.

* * * * *